(12) United States Patent
Michel et al.

(10) Patent No.: US 6,209,881 B1
(45) Date of Patent: Apr. 3, 2001

(54) CAST-IRON PISTON RING

(75) Inventors: Hans-Albert Michel, Leverkusen; Rudolf Linde, Wermelskirchen, both of (DE)

(73) Assignee: Federal-Mogul Burscheid GmbH, Burscheid (DE)

( * ) Notice: Subject to any disclaimer, the term of this patent is extended or adjusted under 35 U.S.C. 154(b) by 0 days.

(21) Appl. No.: 09/079,401

(22) Filed: May 15, 1998

(30) Foreign Application Priority Data

May 17, 1997 (DE) .............................................. 197 20 779

(51) Int. Cl.[7] ..................................... F02F 5/00; F16J 9/26
(52) U.S. Cl. ........................... 277/440; 277/442; 277/443
(58) Field of Search ..................................... 277/310, 440, 277/441, 442, 443, 444

(56) References Cited

U.S. PATENT DOCUMENTS

| | | | |
|---|---|---|---|
| 1,449,615 | * 3/1923 | McLeod | 277/442 |
| 2,313,395 | * 3/1943 | Phillips | 277/442 |
| 2,404,616 | * 7/1946 | Bramberry | 277/443 |
| 3,467,397 | * 9/1969 | Sugahara | 277/442 |
| 4,435,226 | * 3/1984 | Neuhauser et al. | 148/3 |
| 4,570,946 | * 2/1986 | Tsuchiya et al. | 277/443 |
| 4,941,669 | * 7/1990 | Fujisawa et al. | 277/444 |
| 5,405,154 | * 4/1995 | Tsuchiya et al. | 277/443 |

* cited by examiner

*Primary Examiner*—Anthony Knight
*Assistant Examiner*—Vishal Patel
(74) *Attorney, Agent, or Firm*—Venable; Gabor J. Keleman; Ashley J. Wells

(57) ABSTRACT

A cast-iron piston ring for a piston of an internal combustion engine includes a ring composed of cast-iron and having a circumferential surface; a nitrided layer covering the entire circumferential surface of the ring, the nitrided layer including a diffusion layer and a connection layer disposed above the diffusion layer in which the diffusion layer and the connection layer both cover the entire circumferential surface of the ring; and a metal layer which is electrodeposited onto the connection layer, which is composed of a metal having a hardness which is less than that of the connection layer, and which has a thickness of less than 5 μm.

6 Claims, 1 Drawing Sheet

CAST-IRON PISTON RING

BACKGROUND OF THE INVENTION

1. Field of the Invention

The invention relates to a cast-iron piston ring for a piston of an internal combustion engine, the ring having a nitrided layer over its entire circumferential surface, with the nitrided layer comprising a diffusion layer and a connection layer disposed above the diffusion layer.

2. Description of the Related Art

Electrodeposited hard chromium layers or flame-sprayed molybdenum layers are used as anti-wear layers of piston ring surfaces, particularly the running surface, in series use of internal combustion engines. As the power of the engines is increased, these layers reach their individual limits of usefulness with respect to their anti-wear, anti-corrosion and fatigue-limit behavior. To improve the anti-wear behavior, piston rings were exposed to thermochemical treatment methods, among them nitriding. The components to be nitrided are heated in a gas, for example at temperatures between 450°–600° C., with the temperature being maintained for several hours. Nitrogen that has diffused into the surface forms a connection layer comprising a nitrided layer and a diffusion layer, in which the nitrogen content drops continuously until it reaches a residual quantity. The course of the nitrogen content over the cross section corresponds to the course of the hardness.

Because the connection zone is very brittle due to the high degree of hardness, and tends to flake, measures have been disclosed for removing the connection zone. DE 3506746 C2 discloses a generic cast-iron or steel piston ring in which the connection layer was removed so the diffusion layer can be sprayed or coated with a different layer. Because the removal of the connection layer constitutes an additional work cycle in the assembly line of the piston-ring manufacture, the overall manufacturing costs are relatively high.

It is the object of the invention to provide a low-wear piston ring with advantageously-low manufacturing costs.

SUMMARY OF THE INVENTION

In accordance with the invention, this object is accomplished by providing a cast-iron piston ring for a piston of an internal combustion engine, having a nitrided layer over the entire circumferential surface, with the nitrided layer comprising a diffusion layer and a connection layer disposed above the diffusion layer, characterized in that a metal (4) that is less hard than the connection layer (3) is electrodeposited onto the connection layer (3) with a layer thickness of less than 5 μm. The dependent claims document advantageous embodiments of the invention.

The piston ring advantageously has a pearlitic base structure with spherical or vermicular graphite sediments, and comprises 2.5–4.0 wt. % carbon, 1.5–4.0 wt. % silicon, 0.2–2.0 wt. % manganese, max. 0.35 wt. % phosphorous, max. 0.03 wt. %sulfur, max. 3.0 wt. % chromium, max. 1.5 wt. % vanadium, max. 2.5 wt. % molybdenum, max. 0.2 wt. %nickel, 1.0–3.5 wt. % copper, 0.02–2.5 wt. % aluminum, 0.005–0.04 wt. % magnesium, with iron as the remainder. The piston ring advantageously has a layer thickness of the connection layer (3) in a range of 10 to 20 μm. Advantageously, the less-hard metal (4) is a non-ferrous metal, for example, tin, or a non-ferrous heavy metal.

In nitrided cast-iron rings having a soft metal layer, it has been seen that the brittle connection layer does not flake off from the diffusion layer, so the subsequent mechanical processing of the nitrided piston ring, which was necessary up to now, can be eliminated altogether. Thus, it is not only possible to omit the "connection layer removal" work cycle, but the piston ring undergoes no change in mass due to mechanical processing, which has occasionally had a negative impact on the function of the piston ring. The relatively soft, electrodeposited metal layers can be sufficiently fixedly connected to the connection layer.

Because the layers are extremely thin, an optimum contact surface on the piston-ring running surface is created after a few operating hours when the engine is in operation. While the engine operates, the soft layers are removed down to the connection layer, creating an extended contact surface. This contact surface is not complete, that is, the soft metal layer is not removed, until after about 100–200 operating hours.

Hence, with the piston ring of the invention, not only are the manufacturing costs reduced, but at the same time a piston ring having improved run-in behavior is created.

BRIEF DESCRIPTION OF THE DRAWINGS

The invention is illustrated by way of an embodiment in the drawings, and described in detail below. Shown are in.

DESCRIPTION OF THE PREFERRED EMBODIMENTS

Figure 1:
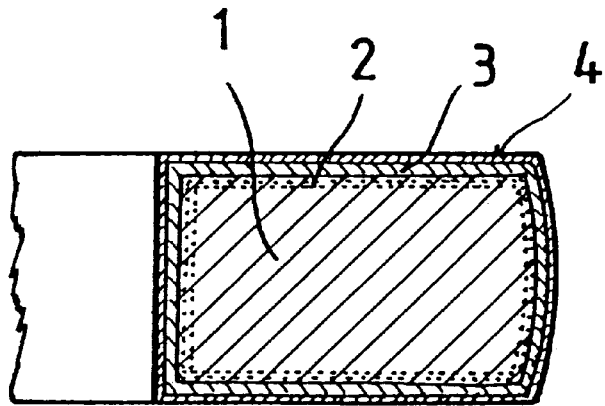
FIG. 1 a cross-section of a piston ring of the invention.

The piston ring (1) shown in FIG. 1 comprises cast iron.

Over its entire circumferential surface, the piston ring (1) is provided with a nitrided layer. This layer comprises a diffusion layer (2) and a connection layer (3). The connection layer (3) is approximately 15 μm thick, and is extremely hard and brittle. A very thin, that is, <5 μm, layer (4) of a non-ferrous metal is electrodeposited onto this connection layer (3). The metal (4) can comprise tin, copper, lead or a copper alloy. A material having a pearlitic base structure and spherical or vermicular graphite sediments is particularly suited as cast iron. Such alloys are especially suited for high temperature stresses.

Figure 2:
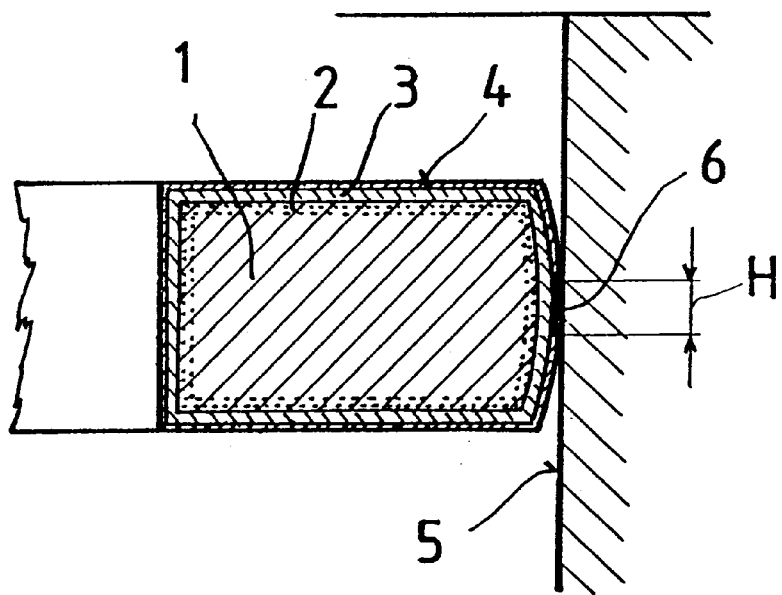
FIG. 2 the piston of FIG. 1 with a running partner (cylinder).

FIG. 2 shows the piston ring (1) in contact with the cylinder running surface (5). Because of the relatively soft metal (4), this layer exhibits wear after only a few hour of operation, resulting in a somewhat extended contact surface (6) having a small axial height (H).

What is claimed is:

1. A cast-iron piston ring for a piston of an internal combustion engine, comprising:
    a ring comprised of cast-iron and having a circumferential surface;
    a nitrided layer covering the entire circumferential surface of the ring, the nitrided layer comprising a diffusion layer and a connection layer disposed above the diffusion layer in which the diffusion layer and the connection layer both cover the entire circumferential surface of the ring; and
    a metal layer which is electrodeposited onto the connection layer, which is comprised of a metal having a hardness which is less than that of the connection layer, and which has a thickness of less than 5 μm.

2. The piston ring according to claim 1, wherein the cast iron has a pearlitic base structure including one of spherical or vermicular graphite sediments, and wherein the cast iron comprises:

from 2.5–4.0 wt. % of carbon,
from 1.5–4.0 wt. % of silicon,
from 0.2–2.0 wt. % of manganese,
a maximum of 0.35 wt. % of phosphorous,
a maximum of 0.03 wt. % of sulfur,
a maximum of 3.0 wt. % of chromium,
a maximum of 1.5 wt. % of vanadium,
a maximum of 2.5 wt. % of molybdenum,
a maximum of 0.2 wt. % of nickel,
from 1.0–3.5 wt. % of copper,
from 0.02–2.5 wt. % of aluminum,
from 0.005–0.04 wt. % magnesium, and
remainder iron.

3. The piston ring according to claim 1, wherein the connection layer has a layer thickness which ranges from 10 to 20 μm.

4. The piston ring according to claim 1, wherein the metal of the metal layer is a non-ferrous metal.

5. The piston ring according to claim 1, wherein the metal of the metal layer is tin.

6. The piston ring according to claim 1, wherein the metal of the metal layer is a non-ferrous heavy metal.

* * * * *